United States Patent [19]

Hattori et al.

[11] 4,196,705

[45] Apr. 8, 1980

[54] ELECTRONIC IGNITION CONTROL METHOD AND APPARATUS

[75] Inventors: Tadashi Hattori, Okazaki; Mamoru Kobashi, Aichi; Tooru Kawase, Toyota; Yoshiki Ueno, Okazaki, all of Japan

[73] Assignees: Nippon Soken, Inc., Nishio; Toyota Jidosha Kogyo Kabushiki Kaisha, Toyota, both of Japan

[21] Appl. No.: 907,618

[22] Filed: May 19, 1978

[30] Foreign Application Priority Data

May 30, 1977 [JP] Japan ................................. 52-63721

[51] Int. Cl.² ............................................. F02P 5/04
[52] U.S. Cl. ........................... 123/117 D; 123/32 EB
[58] Field of Search ......... 123/32 EB, 32 EC, 117 R, 123/117 D; 364/431

[56] References Cited

U.S. PATENT DOCUMENTS

| | | | |
|---|---|---|---|
| 3,927,648 | 12/1975 | Kawai et al. | 123/117 D |
| 4,009,699 | 3/1977 | Hetzler et al. | 123/117 D |
| 4,034,733 | 7/1977 | Noguchi et al. | 123/32 EB X |
| 4,052,967 | 10/1977 | Colling et al. | 123/117 D |

*Primary Examiner*—Tony Argenbright
*Attorney, Agent, or Firm*—Cushman, Darby & Cushman

[57] ABSTRACT

In an electronic ignition control apparatus for a combustion engine, a first memory is provided to store a data indicating a first parameter in relation to rotation speed of the engine to read out a value of the first parameter in accordance with an instant rotation speed of the engine, the first parameter defining an ascent of a linear equation representing a relationship between an optimum period of time for spark advance and an amount of air sucked into the engine in consideration with the rotation speed, and a second memory is provided to store a data indicating a second parameter in relation to the rotation speed to read out a value of the second parameter in accordance with the instant rotation speed, the second parameter defining an ordinates' intersection of the linear equation. The control apparatus further comprises a calculation circuit for calculating the linear equation in accordance with an instant amount of the sucked air and the read-out values of the first and second parameters to obtain the optimum period of time for spark advance in relation to the instant amount of the sucked air.

6 Claims, 8 Drawing Figures

ELECTRONIC IGNITION CONTROL METHOD AND APPARATUS

BACKGROUND OF THE INVENTION

The present invention relates to an electronic control method and apparatus for an internal combustion engine, and more particularly to an improvement of an electronic ignition control method and apparatus as described and claimed in a copending U.S. patent application Ser. No. 872,778 filed on Jan. 27, 1978 in the name of Tadashi Hattori et al.

In such an electronic ignition control apparatus, it was proposed by the inventors that an optimum period of time for spark advance could be determined by the following equation (1) indicating a relationship between the optimum period of time for spark advance and an amount of air sucked into the engine.

$$T_B = \alpha \cdot Ga^{-\beta} \qquad (1)$$

where $T_B$ is the optimum period of time for spark advance and $Ga$ is an amount of the sucked air, where each of $\alpha$ and $\beta$ is a parameter. However, it has been experienced that the optimum period of time for spark advance may not be precisely determined because the above-noted equation (1) is non-linear.

SUMMARY OF THE INVENTION

It is, therefore, a primary object of the present invention to provide an improved ignition control method and apparatus wherein a linear equation is adapted to determine an optimum period of time for spark advance, the linear equation indicating a relationship between the optimum period of time for spark advance and an amount of the sucked air in consideration with rotation speed of the engine.

According to the present invention, there is provided an electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of the engine so as to operate the piston, the control apparatus comprising:

a reference signal generator for producing a reference signal corresponding to the top dead center position of the piston;

a first signal generator responsive to the reference signal for producing a first binary signal indicative of rotation speed of the output shaft;

a second signal generator for producing a second binary signal indicative of a predetermined period of time necessary for generating the spark voltage in the ignition coil;

a third signal generator for producing a third binary signal indicative of an amount of air sucked into the combustion chamber;

first memory means for storing a data indicating a first parameter in relation to the rotation speed of the output shaft to produce a fourth binary signal indicative of a value of the first parameter in accordance with the first binary signal, the first parameter defining an ascent of a linear equation representing a relationship between an optimum period of time for spark advance for activation of the spark plug and an amount of the sucked air in consideration with the rotation speed of the output shaft;

second memory means for storing a data indicating a second parameter in relation to the rotation speed of the output shaft to produce a fifth binary signal indicative of a value of the second parameter in accordance with the first binary signal, the second parameter defining an ordinates' intersection of the linear equation;

a first calculation circuit for calculating the linear equation in accordance with the third, fourth and fifth binary signals to produce a sixth binary signal indicative of the optimum period of time for spark advance in relation to an amount of the sucked air;

a second calculation circuit responsive to the reference signal for calculating a timing to start the energization of the primary winding of the ignition coil in accordance with the first, second and sixth binary signals in the following cycle of the reference signal, the second calculation circuit producing a timing signal indicative of a calculation resultant value; and means responsive to the timing signal for maintaining electric power supply from a source of electricity to the primary winding of the ignition coil within the predetermined period of time defined by the second binary signal.

Figure 1A:
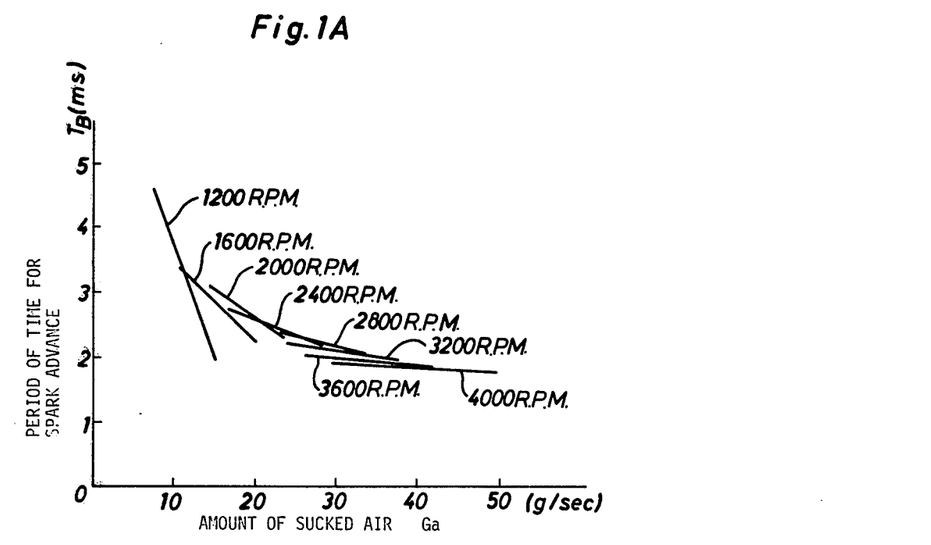
FIG. 1A depicts a graph indicative of a period of time $T_B$ for spark advance in relation to an amount $Ga$ of air sucked into an internal combustion engine in consideration with rotation speed $N$ of the engine.

For an actual practice of the present invention, it has been experimentally observed by the inventors that a data indicating a relationship between the optimum period of time $T_B$ for spark advance and an amount $Ga$ of the sucked air in consideration with rotation speed $N$ of the engine is given by the following linear equation (2), as shown by each of straight lines in FIG. 1A.

$$T_B = -f_1(N)Ga + f_2(N) \qquad (2)$$

where $f_1(N)$ is a parameter indicating an ascent of the linear equation (2), and $f_2(N)$ is a parameter indicating an ordinates' intersection of the linear equation (2). In this case, it should by recognized that the optimum period of time $T_B$ for spark advance may be considered as a time interval necessary for arrival of a piston to its top dead center position after the engine is ignited.

Figure 1B:
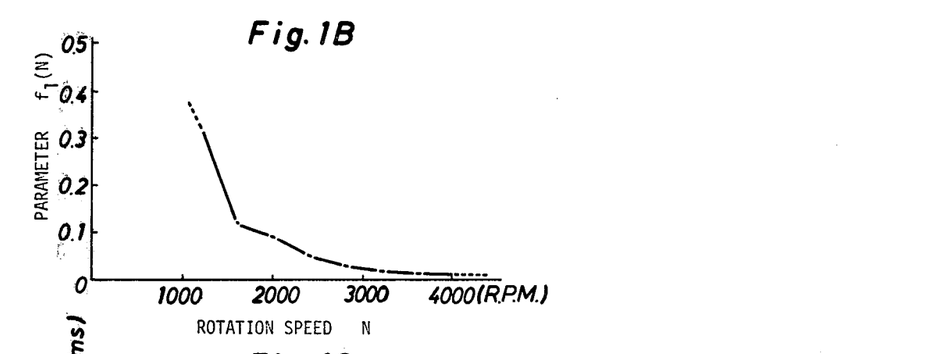
FIGS. 1B and 1C depict graphs respectively indicative of parameters $f_1(N)$ and $f_2(N)$ in relation to the rotation speed $N$.
Figure 1C:
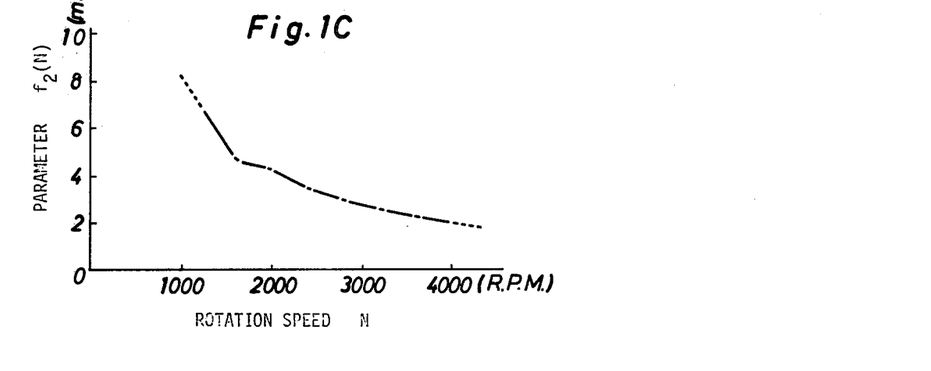

For calculation of the linear equation (2), as shown in FIGS. 1B and 1C, the inventors further obtained first and second data respectively indicating the parameters $f_1(N)$ and $f_2(N)$ in relation to rotation speed $N$ from each of the straight lines in FIG. 1A.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 2:
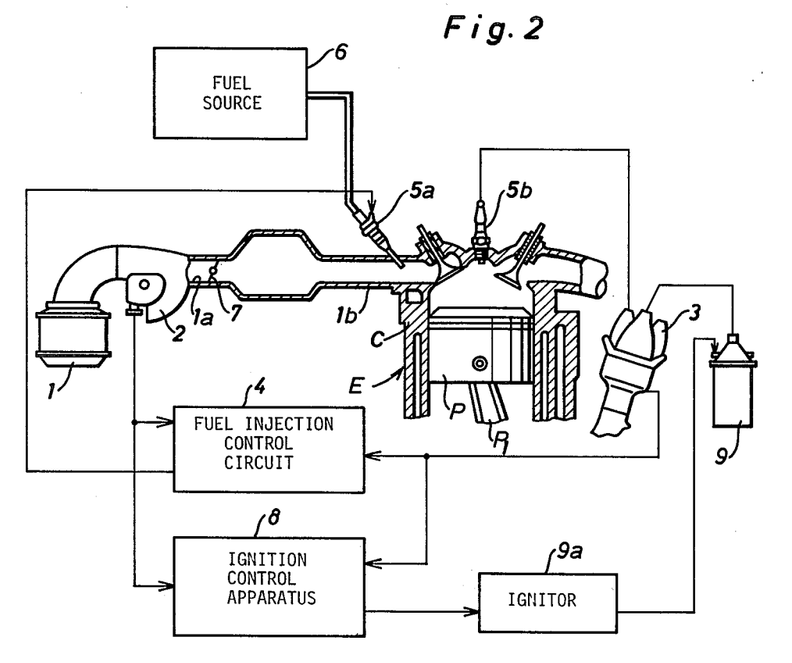
FIG. 2 is a schematic block diagram of an electronic control system for the engine including an electronic ignition control apparatus in accordance with the present invention.

Referring now to the accompanying drawings, in particular to FIG. 2 there is illustrated a schematic block diagram of an electronic control system for an internal combustion engine E including an electronic ignition control apparatus 8 in accordance with the present invention.

The engine E is of a conventional four cylinder, four stroke type and comprises a piston P reciprocable within each cylinder C. The piston P is connected by way of a connecting rod $P_1$ to a crankshaft (not shown) to rotate the crankshaft in response to reciprocation thereof. The engine E also comprises four fuel injectors 5a mounted on an intake manifold 1b and four spark plugs 5b mounted on a cylinder head. Each fuel injector 5a is activated by receiving each electric signal from a fuel injection control circuit 4 to supply fuel from a fuel source 6 into the cylinder C. Each spark plug 5b is energized by a spark voltage from a distributor 3 to ignite air-fuel mixture within the cylinder C. The distributor 3 is provided to distribute the spark voltage from an ignition coil 9 to each spark plug 5b at appropriate intervals.

The electronic control system comprises an air flow meter 2 provided within an induction passage 1a and a reference signal generator 30 (See FIG. 3) provided within the distributor 3. The air flow meter 2 detects an amount of air sucked into the engine E through the induction passage 1a and a throttle valve 7 from an air cleaner 1 to produce an electric signal indicative of an amount of the sucked air. The reference signal generator 30 produces four reference signals a (See FIG. 4) per each rotation of a cam-shaft driven by the crankshaft. The cam-shaft rotates once per two rotations of the crankshaft. The fuel injection control circuit 4 receives electric signals from the air flow meter 2, the reference signal generator 30 and other sensors (not shown) to control an amount of fuel injected from the fuel injector 5a in an optimum value. The ignition control apparatus 8 receives the electric signals from the air flow meter 2 and the reference signal generator 30 to generate an optimum ignition timing signal, which is applied to an ignitor 9a to generate the spark voltage in the ignition coil 9.

Figure 3:
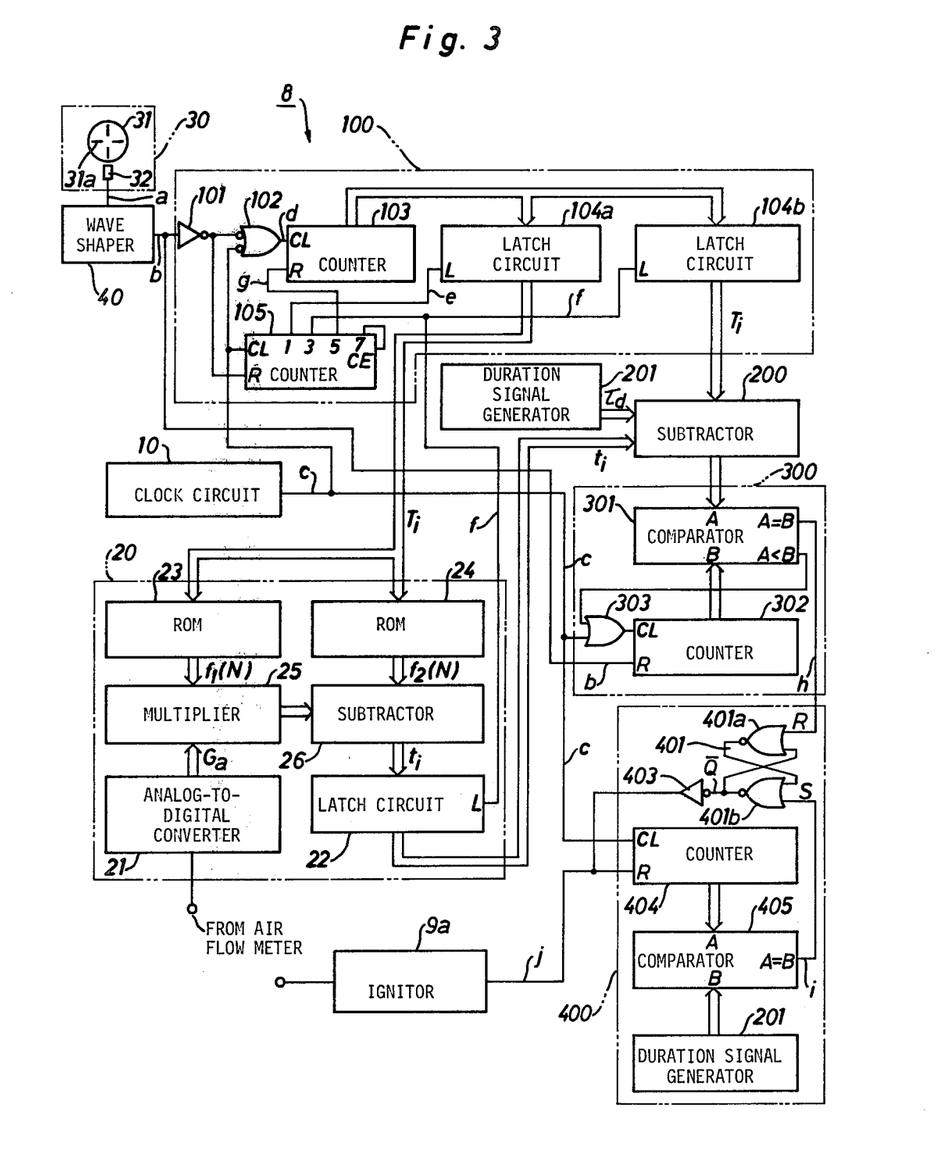
FIG. 3 is a circuit diagram of an embodiment of the ignition control apparatus illustrated in block form in FIG. 2.
Figure 4:
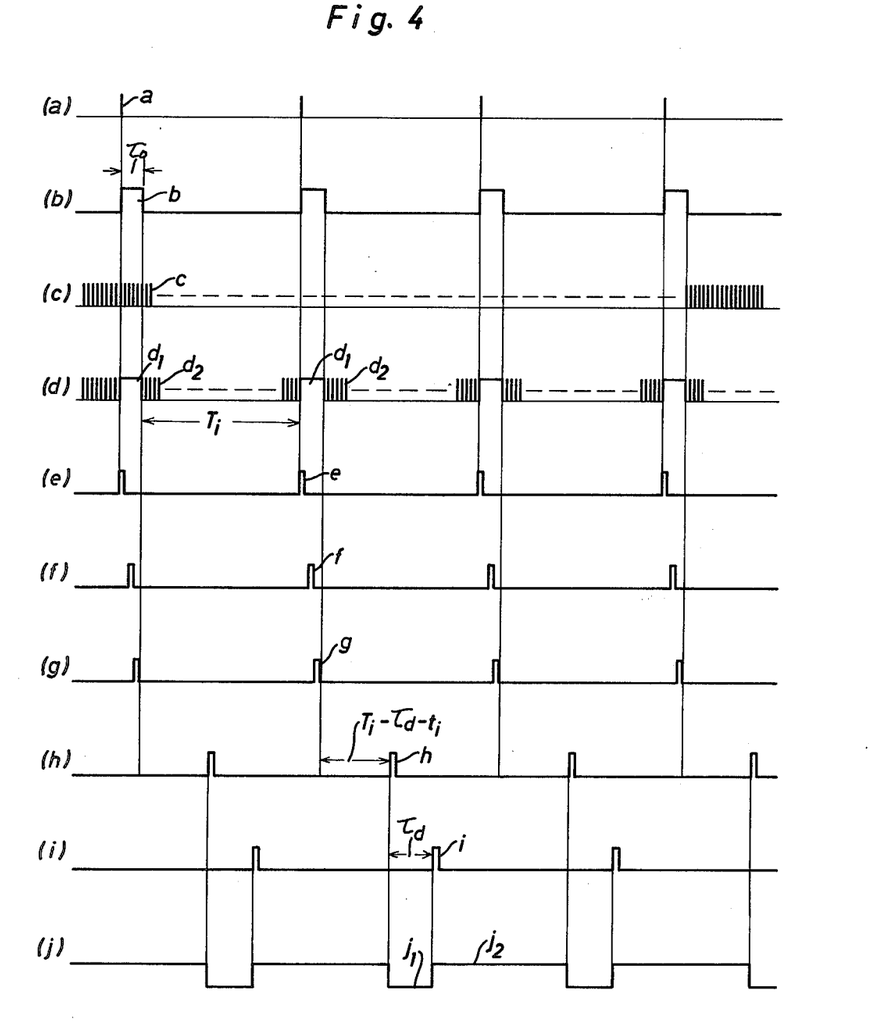
FIG. 4 illustrates waveforms obtained at various points in the control apparatus of FIG. 3.

In FIG. 3, there is illustrated an embodiment of the ignition control apparatus 8 which comprises a period signal generator 100 for receiving a reference signal a from the reference signal generator 30 through a wave shaper 40. The reference signal generator 30 includes a disc 31 coupled to the cam-shaft, and a pair of optical elements 32 located in optic coupling relationship with the disc 31. The disc 31 is provided thereon with four slits 31a at each reference position corresponding with a top dead center position of each piston P. As the disc 31 rotates, the optical elements 32 detect each position of the slits 31a to produce one reference signal a at a half crankshaft rotation (See FIG. 4). The wave shaper 40 receives the reference signal a therein to generate a reshaped rectangular pulse b shown in FIG. 4. The rectangular pulse b has a pulse-width $\tau_0$, which is predetermined regardless of engine rotation, and is synchronized at its leading edge with the reference signal a in phase.

The period signal generator 100 is designed to count clock pulses c (See FIG. 4) from a clock circuit 10 in response to the rectangular pulse b and generate a binary electric signal indicative of a duration $T_i$ corresponding with a difference between a cycle time of the rectangular pulse b and the pulse-width $\tau_0$. The period signal generator 100 comprises an inverter 101 for inverting each rectangular pulse b from the wave shaper 40 and a decade counter 105 of CD 4017 type manufactured by RCA Corporation in U.S.A. When the counter 105 is reset upon receiving an output pulse inverted by the inverter 101, it counts clock pulses c from the clock circuit 10 to generate first and second latch signals e and f and a reset signal g (See FIG. 4) at its output terminals denoted by digits 1, 3 and 5. In other words, the first and second latch signals e and f and the reset signal g are sequentially generated from the counter 105 at a half crankshaft rotation.

The period signal generator 100 includes a binary counter 103 for counting a series of output pulses $d_2$ (See FIG. 4) from a NAND gate 102. NAND gate 102 receives thereto the output pulse from the inverter 101 and clock pulses c from the clock circuit 10 to generate therefrom a rectangular pulse $d_1$ with the pulse-width $\tau_0$ and a series of the output pulses $d_2$ corresponding with a difference between a cycle time of the reference signal a and the pulse-width $\tau_0$ (See FIG. 4). When the counter 103 is reset upon receiving the reset signal g from the counter 105, it counts a series of the output pulses $d_2$ after a lapse of time corresponding with the pulse-width $\tau_0$ of the rectangular pulse $d_1$ to generate the binary electric signal indicative of the duration $T_i$ after completion of its count. In other words, the counter 103 generates the binary signal therefrom at a half crankshaft rotation. This means that the binary signal indicative of the duration $T_i$ is also generated from the counter 103 as a binary signal indicative of a reciprocal of rotation speed of the engine E, because the duration $T_i$ is inversely proportional to the rotation speed. Latch circuits 104a and 104b are provided to latch a binary signal, which is previously produced from the counter 103 in response to a reset signal g prior to the first latch signal e, at respective leading edges of the first and second latch signals e and f from the counter 105. The latched binary signal in the latch circuit 104a is transferred to a calculation circuit 20 at a trailing edge of the first latch signal e, while the latched binary signal in another latch circuit 104b is transferred to a substractor 200 at a trailing edge of the second latch signal f.

In operation of the period signal generator 100, assuming that an inverted output pulse appears from the inverter 101, it is applied to NAND gate 102 and the counter 105. When NAND gate 102 receives clock pulses c from the clock circuit 10 together with the output pulse from the inverter 101, a rectangular pulse $d_1$ and a series of output pulses $d_2$ are sequentially generated from NAND gate 102 and applied to the counter 103. Simultaneously, the counter 105 is reset by the output pulse from the inverter 101 to count clock pulses c from the clock circuit 10 so as to sequentially generate first and second latch signals e and f and a reset signal g therefrom. The first and second latch signals e and f and the reset signal g are respectively applied to the latch circuits 104a and 104b and the counter 103 in sequence. Then, a binary signal, which is previously produced from the counter 103 in response to a reset signal g prior to the first latch signal e, is latched and transferred by the latch circuit 104a to the calculation circuit 20 in response to the first latch signal e and, in turn, is latched and transferred by the latch circuit 104b to the subtractor 200 in response to the second latch signal f. Thereafter, the counter 103 is reset by the above-noted reset signal g following to the second latch signal f to count the above-noted output pulses $d_2$ after a lapse of time corresponding with the pulse-width $\tau_0$ so as to generate another binary signal therefrom upon completion of its count.

The calculation circuit 20 is designed to calculate an optimum period of time $t_i$ for spark advance in accordance with the binary signal from the latch circuit 104a and the electric signal from the air flow meter 2. The calculation circuit 20 comprises an analog-to-digital converter 21 for receiving the electric signal from the air flow meter 2 and read only memories or ROMs 23 and 24 for recieving the binary signal from the latch circuit 104a. The electric signal from the air flow meter 2 is converted by the converter 21 into a binary electric signal indicative of an amount Ga of the sucked air. ROM 23 previously stores therein the data indicating the above-noted first parameter $f_1(N)$ in relation to the rotation speed N, as shown in FIG. 1B, whereas ROM 24 previously stores therein the data indicating the above-noted second parameter $f_2(N)$ in relation to the rotation speed N, as shown in FIG. 1C. Instant values of $f_1(N)$ and $f_2(N)$ are respectively read out from ROMs 23 and 24 in relation to an instant rotation speed defined by the binary signal from the latch circuit 104a by using the stored data. A multiplier 25 is provided to recieve the binary signal indicative of the value of $f_1(N)$ from ROM 23 and the binary signal indicative of an instant amount Ga of the sucked air from the converter 21. An instant amount Ga of the sucked air is multiplied in the multiplier 25 by the value of $f_1(N)$, and a multiplied resultant value $f_1(N)Ga$ is applied to a subtractor 26 as a binary signal. With the subtractor 26, the multiplied value $f_1(N)Ga$ is subtracted from the instant value of $f_2(N)$ defined by the binary signal issued from ROM 24. A latch circuit 22 is provided to latch a subtracted resultant value $\{-f_1(N)Ga+f_2(N)\}$ from the subtractor 26 as a binary signal indicative of the optimum period of time $t_i$ at the leading edge of the second latch signal f. The latched binary signal in the latch circuit 22 is transferred to the subtractor 200 at the trailing edge of the second latch signal f.

In the subtractor 200, the optimum period of time $t_i$ defined by the binary signal from the latch circuit 22 and a predetermined duration $\tau_d$ defined by a binary signal from a duration signal generator 201 are substracted from the duration $T_i$ defined by the binary signal of the latch circuit 104b. The duration signal generator 201 functions to generate the binary signal indicative of the predetermined duration $\tau_d$ corresponding to a predetermined period of time for energizing the primary winding of the ignition coil 9. A subtraction-resultant value $(T_i-\tau_d-t_i)$ in the subtractor 200 is applied as a binary signal to a timing signal generator 300.

The timing signal generator 300 is designed to generate a timing signal h (See FIG. 4) for determining start of energization of the ignition coil primary winding in consideration with the binary signal from the subtractor 200 and clock pulses c from the clock circuit 10 in response to the rectangular pulse b from the wave shaper 40. The generator 300 includes a comparator 301 for receiving at its terminals A and B the binary signal from the subtractor 200 and a binary signal indicative of a counted value from a binary counter 302. The counter 302 is reset upon receiving the rectangular pulse b from the wave shaper 40 to count a series of output pulses which is issued from an OR gate 303, as described below. In the comparator 301, while the counted value defined by the binary signal from the counter 302 is smaller than the subtraction-resultant value defined by the binary signal from the subtractor 200, the comparator 301 generates low level signals at its respective terminals A=B and A<B. When the counted value becomes equal to the subtraction-resultant value, the timing signal h appears at the terminal A=B of the comparator 301. Thereafter, the counted value becomes larger than the subtraction-resultant value so that the comparator 301 generates at its terminal A<B a high level signal. OR gate 303 receives at its input terminals clock pulses c from the clock circuit 10 and the low level signal appearing at the terminal A<B of the comparator 301 to generate a series of the output pulses at its output terminal. When OR gate 303 receives at one input terminal thereof the high level signal appearing at the terminal A<B of the comparator 301, it generates therefrom a high level signal for stopping counting function of the counter 302.

The ignition control apparatus 8 further comprises a setting signal generator 400 which produces an electric signal for setting the primary winding of the ignition coil 9 in an energized condition in response to the timing signal h during the predetermined duration $\tau_d$ defined by the binary signal from the duration signal generator 201. The setting signal generator 400 comprises an inverter 403 driven by a flip-flop 401 composed of NOR gates 401a and 401b, and a comparator 405 for receiving at its terminals A and B a binary signal from a counter 404 and the binary signal from the duration signal generator 201. When the counter 404 is reset upon receiving a low level signal $j_1$ (See FIG. 4) which is issued from the inverter 403, as described below, it counts clock pulses c from the clock circuit 10 to generate the binary signal indicative of a counted resultant value therefrom. In the comparator 405, when the counted value defined by the binary signal from the counter 404 becomes equal to the predetermined duration $\tau_d$ defined by the binary signal from the duration signal generator 201, the comparator 405 generates at its terminal A=B an output signal i shown in FIG. 4.

Flip-flop 401 receives at its input terminal R the timing signal h from the comparator 301 to generate a high level signal at its output terminal $\overline{Q}$. When flip-flop 401 receives at its input terminal s the output signal i from the comparator 405, it generates at its output terminal $\overline{Q}$ a low level signal. The inverter 403 receives the high level signal from flip-flop 401 to generate the low level signal $j_1$ therefrom and also receives the low level signal from flip-flop 401 to generate a high level signal $j_2$. The ignitor 9a receives the low level signal $j_1$ from the inverter 403 to energize the primary winding of the ignition coil 9. When the ignitor 9a also receives the high level signal $j_2$ from the inverter 403 as an ignition timing signal, it deenergizes the primary winding of the ignition coil 9. This means that the ignition coil 9 generates the spark voltage at a leading edge of the high level signal $j_2$. In addition, the counter 404 stops counting function thereof upon receiving the high level signal $j_2$ from the inverter 403.

In operation, assuming that one of the pistons P reaches its top dead center position during rotation of the engine E, the reference signal generator 30 produces a reference signal a (See FIG. 4) which is applied to the wave shaper 40. The reference signal a is reshaped by the wave shaper 40 and then applied as a rectangular pulse b (See FIG. 4) to the period signal generator 100 and the timing signal generator 300. In the period signal generator 100, the rectangular pulse b is received and inverted by the inverter 101 into an output pulse which is applied to NAND gate 102 and the counter 105. When NAND gate 102 receives clock pulses c from the clock circuit 10 together with the output pulse from the inverter 101, it generates therefrom a rectangular pulse $d_1$ and a series of output pulses $d_2$ (See FIG. 4) which are applied to the counter 103. Simultaneously, the counter 105 is reset by the output pulse from the inverter 101 and counts clock pulses c from the clock circuit 10 to sequentially generate therefrom first and second latch signals e and f and a reset signal g (See FIG. 4). The first latch signal e is applied to the latch circuit 104a, the second latch signal f is applied to the latch circuit 104b and the calculation circuit 20, and the reset signal g is applied to the counter 103. Then, a binary signal, which is previously produced from the counter 103 in response to a reset signal g prior to the first latch signal e, is latched and transferred by the latch circuit 104a to ROMs 23 and 24 of the calculation circuit 20 in response to the first latch signal e.

When instant values of $f_1(N)$ and $f_2(N)$ are respectively read out from ROMs 23 and 24 in relation to an instant rotation speed N defined by the binary signal from the latch circuit 104a, they are respectively applied as a binary signal to the multiplier 25 and the subtractor 26. Meanwhile, an electric signal from the air flow meter 2 is converted by the analog-to-digital converter 21 and applied to the multiplier 25 as a binary signal indicative of an instant amount Ga of the sucked air. Then, an instant amount Ga of the sucked air is multiplied in the multiplier 25 by the instant value of $f_1(N)$, and a multiplied resultant value $Gaf_1(N)$ is applied to the subtractor 26 as a binary signal. When the subtractor 26 receives the binary signals from the multiplier 25 and ROM 24, as described above, the multiplied resultant value $Gaf_1(N)$ is subtracted by the subtractor 26 from the instant value of $f_2(N)$, and a subtraction-resultant value $\{-f_1(N)Ga+f_2(N)\}$ is latched and transferred by the latch circuit 22 to the subtractor 200 as a binary signal indicative of an optimum period of time $t_i$ in response to the second latch signal f from the counter 105. Simultaneously, the above-noted binary signal, which is previously produced from the counter 103 in response to the reset signal g prior to the first latch signal e, is latched and transferred by the latch circuit 104b to the subtractor 200 in response to the second latch signal f. Then, the counter 103 is reset by the reset signal g following to the second latch signal f and counts a series of the output pulses $d_2$ from NAND gate 102 after the lapse of time defined by the pulse-width $\tau_0$ to generate another binary signal therefrom.

When the subtractor 200 receives a binary signal from the duration signal generator 201 together with the binary signals from the latch circuits 22 and 104b, the optimum period of time $t_i$ and the predetermined duration $\tau_d$, which are respectively defined by the binary signals from the latch circuit 22 and the duration signal generator 201, are subtracted in the subtractor 200 from the duration $T_i$ defined by the binary signal of the latch circuit 104b. Then, a subtraction-resultant value $(T_i - \tau_d - t_i)$ from the subtractor 200 is applied as a binary signal to the comparator 301 of the timing signal generator 300.

When the counter 302 in the timing signal generator 300 is reset upon receiving the rectangular pulses b from the wave shaper 40, it counts a series of output pulses from OR gate 303. A counted resultant value from the counter 302 is applied to the comparator 301 as a binary signal. When the counted resultant value defined by the binary signal from the counter 302 becomes equal to the subtraction-resultant value defined by the binary signal from the subtractor 200, the comparator 301 generates at its terminal A=B a high level signal h which is applied to the setting signal generator 400. This means that the high level signal h from the timing signal generator 300 is applied to the setting signal generator 400 as a timing signal for determining start of energization of the ignition coil primary winding after a lapse of time corresponding to the subtraction-resultant value of the binary signal from the subtractor 200. In addition, when the counted resultant value becomes larger than the subtraction-resultant value, the comparator 301 generates at its terminal A<B a high level signal which is applied to the input terminal of OR gate 303. Then, OR gate 303 generates therefrom a high level signal which is applied to the counter 302 to stop counting function of the counter 302.

In the setting signal generator 400, when flip-flop 401 receives at its input terminal R the timing signal h from the comparator 301, it generates at its output terminal $\overline{Q}$ a high level signal which is inverted by the inverter 403 and applied as a low level signal $j_1$ to the ignitor 9a and the counter 404. Then, the primary winding of the ignition coil 9 is energized by the ignitor 9a in response to the low level signal $j_1$, while the counter 404 is released from a reset condition upon receiving the low level signal $j_1$ to count clock pulses c from the clock circuit 10. Subsequently, a binary signal indicative of a counted resultant value from the counter 404 is applied to the comparator 405 together with a binary signal indicative of the duration $\tau_d$ from the duration signal generator 201. When the counted resultant value becomes equal to the duration $\tau_d$, the comparator 405 generates at its terminal A=B an output pulse i (See FIG. 4) which is applied to the input terminal s of flip-flop 401. Then, the low level signal $j_1$ appearing at the output terminal $\overline{Q}$ of flip-flop 401 is inverted by the inverter 403 into a high level signal $j_2$. When the ignitor 9a receives the high level signal $j_2$ from the inverter 403 as an ignition timing signal, it deenergizes the primary winding of the ignition coil 9 to generate a apark voltage in the secondary winding of the ignition coil 9.

Figure 5:
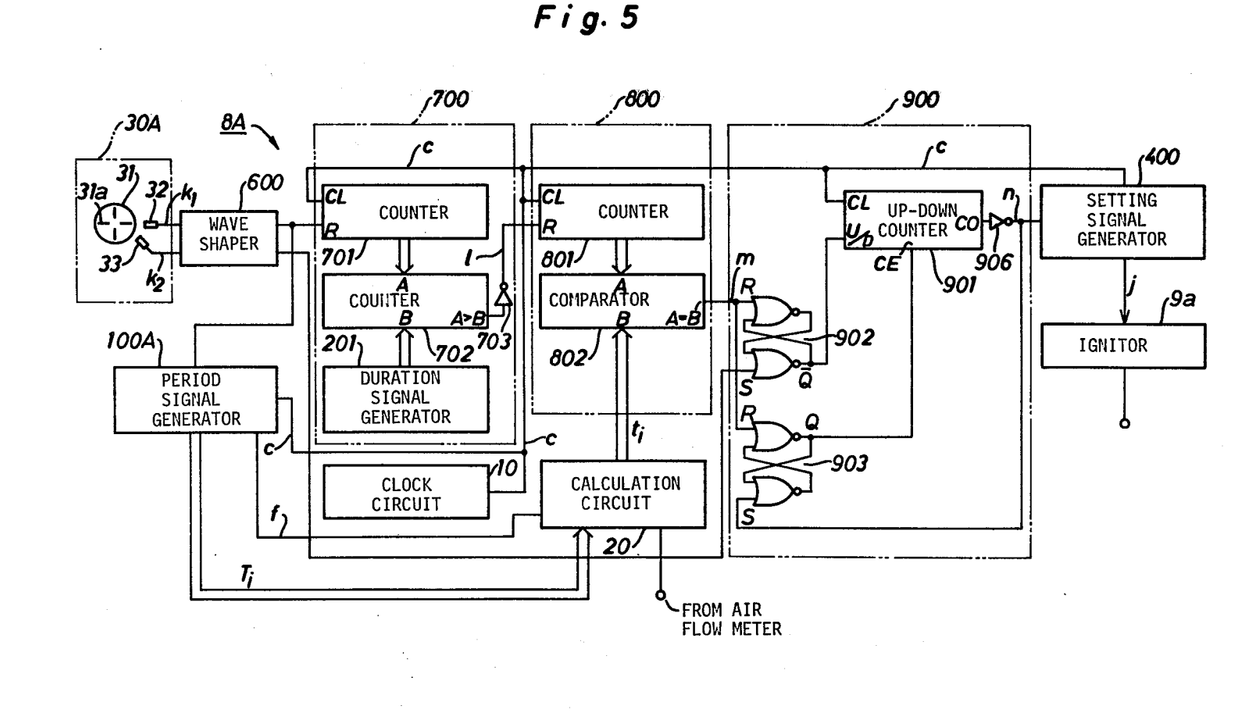
FIG. 5 is a circuit diagram of another embodiment of the ignition control apparatus illustrated in block form in FIG. 2.

FIG. 5 illustrates another embodiment of the ignition control apparatus 8 described hereinafter in detail. The ignition control apparatus 8A comprises a wave shaper 600 for receiving first and second reference signals $k_1$ and $k_2$ (See FIG. 6) from a reference signal generator 30A. The reference signal generator 30A is provided within the distributor 3 in replacement of the reference signal generator 30 previously described. The generator 30A includes the disc 31 and the optical elements 32 of the generator 30 and also includes another optical elements 33. The optical elements 32 are located in optic coupling relationship with the disc 31, as previously described, the detect each slit 31a of the disc 31 at a reference position corresponding with the top dead center position of each piston P. Meanwhile, the optical elements 33 are located in optic coupling relationship with the disc 31 to detect each slit 31a of the disc 31 at a reference position corresponding with a bottom dead center position of the piston P. As the disc 31 rotates, the optical elements 32 generate the first reference signal $k_1$ per a half crankshaft rotation at the position corresponding with the top dead center position of the piston P, whereas the optical elements 33 generate the second reference signal $k_2$ per a half crankshaft rotation at the position corresponding with the bottom dead center position of the piston P. The wave shaper 600 reshapes the first and second reference signals $k_1$ and $k_2$ into first and second output pulses.

The ignition control apparatus 8A further comprises a period signal generator 100A and a first delay signal generator 700 which receive the first output fulse from the wave shaper 600. The period signal generator 100A has the same construction as that of the above-noted period signal generator 100 without the latch circuit 104b. The period signal generator 100A functions to transfer the binary signal from the calculation circuit 20 to a second delay signal generator 800 in response to the second latch signal f therefrom. The first signal generator 700 comprises a comparator 702 for receiving at its terminals A and B a binary signal from a counter 701 and the binary signal from the above-noted duration signal generator 201. The counter 701 is reset upon receiving the first output pulse from the wave shaper 600 to count clock pulses c from the clock circuit 10.

The comparator 702 functions to compare a counted value defined by the binary signal from the counter 701 with the predetermined duration $\tau_d$ defined by the binary signal from the generator 201. While the counted value is smaller than the predetermined duration $\tau_d$, the comparator 702 generates a low level signal at its terminal A>B. In other words, the counter 702 generates therefrom the low level signal till lapse of time corresponding to the predetermined duration $\tau_d$ after receiving the first output pulse from the wave shaper 600. When the counted value becomes larger than the predetermined duration $\tau_d$, the comparator 702 generates a high level signal at its terminal A>B. In other words, the comparator 702 generates therefrom the high level signal with a first predetermined time lag corresponding to the predetermined duration $\tau_d$. The low and high level signals from the counter 702 are respectively inverted by an inverter 703 and applied to the second delay signal generator 800 as high and low level signals $l_1$ and $l_2$ (See FIG. 6). This means that the high level signal $l_1$ from the inverter 703 is applied as a reset signal to the second delay signal generator 800 and the low level signal $l_2$ from the inverter 703 is applied to the second delay signal generator 800 with the first predetermined time lag after generation of the first reference signal $k_1$.

The second delay signal generator 800 comprises a comparator 802 for receiving at its terminals A and B as a binary signal from a counter 801 and the binary signal from the calculation circuit 20. When the counter 801 is reset upon receiving the high level signal $l_1$ from the inverter 703, it starts to count clock pulses c from the clock circuit 10 at a trailing edge of the high level signal $l_1$. This means that the counter 801 starts to count clock pulses c with the first predetermined time lag after generation of the first reference signal $k_1$. The comparator 802 functions to compare a counted value defined by the binary signal from the counter 801 with the optimum period of time $t_i$ defined by the binary signal from the calculation circuit 20. When the counted value becomes equal to the optimum period of time $t_i$, the comparator 802 generates at its terminal A=B an output pulse m (See FIG. 6). This means that the comparator 802 generates therefrom the output pulse m with the second predetermined time lag corresponding to the optimum period of time $t_i$ after the generation of the low level signal $l_2$ from the inverter 703.

In the ignition control apparatus 8A, a timing signal generator 900 comprises an up-down counter 901 driven by a flip-flop 902. Flip-flop 902 receives at its terminal R the output pulse m from the comparator 802 to generate at its terminal Q a reset pulse and thereafter receives at its terminal S the second output pulse from the wave shaper 600 to generate at its terminal Q another reset pulse. When the counter 901 is reset upon receiving the reset pulse from flip-flop 902, it counts up clock pulses c from the clock circuit 10. This means that the counter 901 starts to count up clock pulses c with the second predetermined time lag after generation of the low level signal $l_2$ from the first delay signal generator 700. Thereafter, the counter 901 is reset upon receiving another reset pulse from flip-flop 902 and counts down the counted value thereof to zero to generate an output pulse at its terminal CO. This means that the counter 901 generates the output pulse therefrom with a time lag corresponding with a difference between a cycle time of the first reference signal $k_1$ and a duration of $2(\tau_d+t_i)$ after generation of the low level signal $l_2$. The output pulse from the counter 901 is inverted by an inverter 906 and then applied to the setting signal generator 400 as a timing signal n (See FIG. 6). In addition, a flip-flop 903 functions to receive at its terminal R the output pulse m from the comparator 802 so as to generate an output pulse for permitting counting function of the counter 901. Flip-flop 903 also receives at its terminal S the timing signal n from the inverter 906 to generate another output pulse for stopping the counting function of the counter 901.

Thus, in the timing signal generator 900, it will be understood that count of clock pulses c is started with a total of the first and second predetermined time lags after generation of the first reference signal $k_1$ and generation of the timing signal n is conducted with a third predetermined time lag corresponding to a difference between a cycle time of the first reference signal $k_1$ and a duration of $(\tau_d+t_i)$ after the generation of the first reference signal $k_1$.

Figure 6:
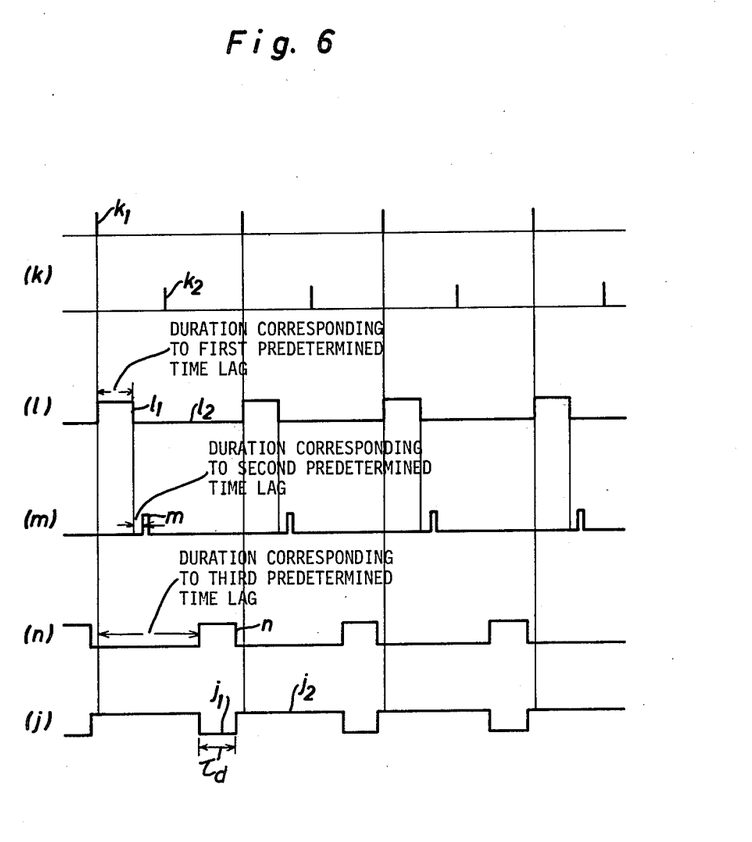
FIG. 6 illustrates waveforms obtained at various points in the control apparatus of FIG. 5.

The setting signal generator 400 receives the timing signal n from the generator 900 to generate the low level signal $j_1$ therefrom (See FIG. 6). Thereafter, the setting signal generator 400 generates the high level signal $j_2$ therefrom with the first predetermined time lag after generation of the low level signal $j_1$. The ignitor 9a receives the low level signal $j_1$ from the setting signal generator 400 to energize the primary winding of the ignition coil 9. The ignitor 9a also receives the high level signal $j_2$ from the setting signal generator 400 as an ignition timing signal to deenergize the primary winding.

In operation, assuming that one of the pistons P reaches its top dead center position during rotation of the engine E, the reference signal generator 30A produces a first reference signal $k_1$ which is applied to the wave shaper 600. The first reference signal $k_1$ is reshaped by the wave shaper 600 and then applied as a first output pulse to the period signal generator 100A and the first delay signal generator 700. Then, a binary signal indicative of a duration $T_i$ is generated in the period signal generator 100A in response to the first output pulse from the wave shaper 600, and is applied to the calculation circuit 20 in response to a first latch signal e. Subsequently, a binary signal indicative of an optimum period of time $t_i$ is produced in the calculation circuit 20 in accordance with the binary signal from the generator 100A and an electric signal from the air flow meter 2 and is applied to the second delay signal generator 800 in response to a second latch signal f from the generator 100A.

Meanwhile, when the counter 701 in the first delay signal generator 700 receives the first output pulse from the wave shaper 600, as described above, it is reset by the first output pulse to count clock pulses c from the clock circuit 10. Then, a binary signal indicative of a counted value from the counter 701 is applied to the comparator 702 together with a binary signal indicative of the duration $\tau_d$ from the duration signal generator 201. While the counted value is smaller than the duration $\tau_d$, the comparator 702 generates therefrom a low level signal which is inverted by the inverter 703 and applied as a high level signal $l_1$ to the counter 801 to reset the counter 801. When the counted value becomes larger than the duration $\tau_d$, the comparator 702 generates therefrom a high level signal which is inverted by the inverter 703 and applied to the counter 801 as a low level signal $l_2$.

Then, the counter 801 is released from its reset condition in response to the low level signal $l_2$ and starts to count clock pulses c from the clock circuit 10. In other words, the counter 801 starts to count clock pulses c with the first predetermined time lag after generation of the first reference signal $k_1$. Subsequently, a binary signal indicative of a counted value from the counter 801 is applied to the comparator 802. When the comparator 802 receives the binary signals from the counter 801 and the calculation circuit 20, as previously described, the counted value defined by the binary signal from the counter 801 is compared by the comparator 802 with the optimum period of time $t_i$ defined by the binary signal from the calculation circuit 20. When the counted value becomes equal to the optimum period of time $t_i$, the comparator 802 generates an output pulse m therefrom which is applied to the timing signal generator 900.

When flip-flops 902 and 903 in the generator 900 receive at their terminals R the output pulse m from the comparator 802, flip-flop 902 generates at its terminal $\overline{Q}$ a reset pulse which is applied to the terminal U/D of the up-down counter 901. Simultaneously, flip-flop 903 generates at its terminal Q an output pulse which is applied to the terminal CE of the counter 901. Then, the counter 901 is permitted counting function thereof by the output pulse of flip-flop 903 and simultaneously reset by the reset pulse from flip-flop 902 to count up clock pulses c from the clock circuit 10. This means that the counter 901 starts to count up clock pulses c with the second predetermined time lag after generation of the low level signal $l_2$ from the first delay signal generator 700.

When one of the pistons P reaches its bottom dead center position, the reference signal generator 30A produces a second reference signal $k_2$ which is applied to the wave shaper 600. The second reference signal $k_2$ is reshaped by the wave shaper 600 and applied to the terminal S of flip-flop 902. Then, flip-flop 902 generates at its terminal $\overline{Q}$ another reset pulse which is applied to the terminal U/D of the counter 901. Thereafter, the counter 901 is again reset by another reset pulses from flip-flop 902 and counts down a counted value thereof to zero to generate at its terminal CO an output pulse. In other words, the counter 901 generates the output pulse with the third predetermined time lag after generation of the first reference signal $k_1$. The output pulse from the counter 901 is inverted by the inverter 906 and applied as a timing signal n to flip-flop 903 and the setting signal generator 400. In this state, flip-flop 903 generates at its terminal Q another output pulse in response to the timing signal n. Then, another output pulse is applied to the terminal CE of the counter 901 to stop counting function of the counter 901.

When the setting signal generator 400 receives the timing signal n from the inverter 906, it generates a low level signal $j_1$ therefrom which is applied to the ignitor 9a. Then, the ignitor 9a energizes the primary winding of the ignition coil 9. This means that the ignitor 9a energizes the primary winding with the third predetermined time lag after generation of the first reference signal $k_1$. Thereafter, when the setting signal generator 400 generates a high level signal $j_2$ therefrom with the first predetermined time lag after generation of the low level signal $j_1$, the high level signal $j_2$ is applied as an ignition timing signal to the ignitor 9a which deenergizes the primary winding.

Having now fully set forth both structure and operation of preferred embodiments of the concept underlying the present invention, various other embodiments as well as certain veriations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the control apparatus comprising:

a reference signal generator for producing a reference signal corresponding to the top dead center position of said piston;

a first signal generator responsive to the reference signal for producing a first binary signal indicative of rotation speed of said output shaft;

a second signal generator for producing a second binary signal indicative of a predetermined period of time necessary for generating the spark voltage in said ignition coil;

a third signal generator for producing a third binary signal indicative of an amount of air sucked into said combustion chamber;

first memory means for storing a data indicating a first parameter in relation to the rotation speed of said output shaft to produce a fourth binary signal indicative of a value of said first parameter in accordance with the first binary signal, said first parameter defining an ascent of a linear equation representing a relationship between an optimum period of time for spark advance for activation of said spark plug and an amount of the sucked air in consideration with the rotation speed of said output shaft;

second memory means for storing a data indicating a second parameter in relation to the rotation speed of said output shaft to produce a fifth binary signal indicative of a value of said second parameter in accordance with the first binary signal, said second parameter defining an ordinates' intersection of the linear equation;

a first calculation circuit for calculating the linear equation in accordance with the third, fourth and fifth binary signals to produce a sixth binary signal indicative of the optimum period of time for spark advance in relation to an amount of the sucked air;

a second calculation circuit responsive to the reference signal for calculating a timing signal to start the energization of the primary winding of said ignition coil in accordance with the first, second and sixth binary signals in the following cycle of the reference signal, said second calculation circuit producing a timing signal indicative of a calculation resultant value; and means responsive to the timing signal for maintaining electric power supply from a source of electricity to the primary winding of said ignition coil within the predetermined period of time defined by the second binary signal.

2. An electronic ignition control apparatus as claimed in claim 1, wherein said first calculation circuit comprises:
   a multiplier for multiplying a value of the fourth binary signal by a value of the third binary signal;
   a subtractor for subtracting a multiplied resultant value from a value of the fifth binary signal; and
   a latch circuit for latching a subtraction resultant value as a binary signal in response to the reference signal to produce the sixth binary signal.

3. An electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the control apparatus comprising:
   a reference signal generator for producing first and second reference signals respectively corresponding to the top and bottom dead center positions of said piston;
   a first signal generator responsive to the first reference signal for producing a first binary signal indicative of rotation speed of said output shaft;
   a second signal generator for producing a second binary signal indicative of a predetermined period of time necessary for generating the spark voltage in said ignition coil;
   a third signal generator for producing a third binary signal indicative of an amount of air sucked into said combustion chamber;
   a clock circuit for producing clock pulses in a constant frequency;
   first memory means for storing a data indicating a first parameter in relation to the rotation speed of said output shaft to produce a fourth binary signal indicative of a value of said first parameter in accordance with the first binary signal, said first parameter defining an ascent of a linear equation representing a relationship between an optimum period of time for spark advance for activation of said spark plug and an amount of the sucked air in consideration with the rotation speed of said output shaft;
   second memory means for storing a data indicating a second parameter in relation to the rotation speed of said output shaft to produce a fifth binary signal indicative of a value of said second parameter in accordance with the first binary signal; said second parameter defining an ordinates' intersection of the linear equation;
   a first calculation circuit for calculating the linear equation in accordance with the third, fourth and fifth binary signals to produce a sixth binary signal indicative of the optimum period of time for spark advance in relation to an amount of the sucked air;
   a second calculation circuit responsive to the first reference signal for calculating a total period of time defined by the second and sixth binary signals to produce an output signal with a predetermined time lag corresponding to the total period of time after generation of the first reference signal;
   an up-down counter circuit responsive to the output signal from the second calculation circuit for counting up the number of the clock pulses corresponding with a difference between a half cycle time of the first reference signal and the total period of time and subsequently responsive to the second reference signal for counting down the counted number of the clock pulses to produce a timing signal for starting the energization of the primary winding; and
   means responsive to the timing signal for maintaining electric power supply from a source of electricity to the primary winding of said ignition coil within the predetermined period of time defined by the second binary signal.

4. An electronic ignition control apparatus as claimed in claim 3, wherein said first calculation circuit comprises:
   a multiplier for multiplying a value of the fourth binary signal by a value of the third binary signal;
   a subtractor for subtracting a multiplied resultant value from a value of the fifth binary signal; and
   a latch circuit for latching a subtraction resultant value as a binary signal in response to the first reference signal to produce the sixth binary signal.

5. An electronic ignition control method for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the method comprising the steps of:
   a. producing a reference signal corresponding to the top dead center position of said piston;
   b. producing a first binary signal indicative of rotation speed of said output shaft in response to the reference signal;
   c. producing a second binary signal indicative of a predetermined period of time necessary for generating the spark voltage in said ignition coil;
   d. producing a third binary signal indicative of an amount of air sucked into said combustion chamber;

e. storing a data indicating a first parameter in relation to the rotation speed of said output shaft to produce a fourth binary signal indicative of a value of said first parameter in accordance with the first binary signal, said first parameter defining an ascent of a linear equation representing a relationship between an optimum period of time for spark advance for activation of said spark plug and an amount of the sucked air in consideration with the rotation speed of said output shaft;

f. storing a data indicating a second parameter in relation to the rotation speed of said output shaft to produce a fifth binary signal indicative of a value of said second parameter in accordance with the first binary signal, said second parameter defining an ordinates' intersection of the linear equation;

g. calculating the linear equation in accordance with the third, fourth and fifth binary signals to produce a sixth binary signal indicative of the optimum period of time for spark advance in relation to an amount of the sucked air;

h. calculating a timing signal to start the energization of the primary winding of said ignition coil in the following cycle of the reference signal in accordance with the first, second and sixth binary signals upon generation of the reference signal and producing a timing signal indicative of a calculation resultant value; and i. energizing the primary winding of said ignition coil in response to the timing signal to maintain the energization of the primary winding within the predetermined period of time defined by the second binary signal.

6. An electronic ignition control method for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the method comprising the steps of:

a. producing first and second reference signals respectively corresponding to the top and bottom dead center positions of said piston;

b. producing a first binary signal indicative of rotation speed of said output shaft in response to the first reference signal;

c. producing a second binary signal indicative of a predetermined period of time necessary for generating the spark voltage in said ignition coil;

d. producing a third binary signal indicative of an amount of air sucked into said combustion chamber;

e. producing clock pulses in a constant frequency;

f. storing a data indicating a first parameter in relation to the rotation speed of said output shaft to produce a fourth binary signal indicative of a value of said first parameter in accordance with the first binary signal, said first parameter defining an ascent of a linear equation representing a relationship between an optimum period of time for spark advance for activation of said spark plug and an amount of the sucked air in consideration with the rotation speed of said output shaft;

g. storing a data indicating a second parameter in relation to the rotation speed of said output shaft to produce a fifth binary signal indicative of a value of said second parameter in accordance with the first binary signal, said second parameter defining an ordinates' intersection of the linear equation;

h. calculating the linear equation in accordance with the third, fourth and fifth binary signals to produce a sixth binary signal indicative of the optimum period of time for spark advance in relation to an amount of the sucked air;

i. calculating a total period of time defined by the second and sixth binary signals in response to the first reference signal to produce an output signal with a predetermined time lag corresponding to the total period of time after generation of the first reference signal;

j. counting up the number of the clock pulses corresponding with a difference between a half cycle time of the first reference signal and the total period of time in response to the output signal and subsequently counting down the counted number of the clock pulses in response to the second reference signal to produce a timing signal for starting the energization of the primary winding; and k. energizing the primary winding of said ignition coil in response to the timing signal to maintain the energization of the primary winding within the predetermined period of time defined by the second binary signal.

* * * * *